(12) United States Patent
Gremetz et al.

(10) Patent No.: US 11,850,564 B2
(45) Date of Patent: Dec. 26, 2023

(54) HEAT EXCHANGE FLOW REACTOR

(71) Applicant: CORNING INCORPORATED, Corning, NY (US)

(72) Inventors: Sylvain Maxime F Gremetz, Varennes sur Seine (FR); Elena Daniela Lavric, Avon (FR)

(73) Assignee: CORNING INCORPORATED, Corning, NY (US)

( * ) Notice: Subject to any disclaimer, the term of this patent is extended or adjusted under 35 U.S.C. 154(b) by 13 days.

(21) Appl. No.: 17/636,948

(22) PCT Filed: Aug. 31, 2020

(86) PCT No.: PCT/US2020/048718
§ 371 (c)(1),
(2) Date: Feb. 21, 2022

(87) PCT Pub. No.: WO2021/042023
PCT Pub. Date: Mar. 4, 2021

(65) Prior Publication Data
US 2022/0274082 A1    Sep. 1, 2022

Related U.S. Application Data

(60) Provisional application No. 62/894,784, filed on Aug. 31, 2019.

(51) Int. Cl.
*B01J 19/02* (2006.01)
*B01J 19/24* (2006.01)

(52) U.S. Cl.
CPC .......... *B01J 19/02* (2013.01); *B01J 19/2415* (2013.01); *B01J 2219/0263* (2013.01)

(58) Field of Classification Search
CPC .... B01J 19/00; B01J 19/0006; B01J 19/0013; B01J 19/0093; B01J 19/02; B01J 19/24;
(Continued)

(56) References Cited

U.S. PATENT DOCUMENTS 8,574,500 B2    11/2013   Meschke et al.
2004/0025784 A1  2/2004   Kawamura et al.
(Continued)

FOREIGN PATENT DOCUMENTS

CN    102506606 B    2/2014
CN    203572278 U    4/2014
(Continued)

OTHER PUBLICATIONS

Couper et al., "Chemical Process Equipment", Third Edition, Butterworth-Heinemann, 2012, 802 pages.
(Continued)

*Primary Examiner* — Natasha E Young
(74) *Attorney, Agent, or Firm* — Daniel J. Greenhalgh

(57) ABSTRACT

A flow reactor includes a flow reactor module having a heat exchange fluid enclosure with an inner surface sealed against a surface of a process fluid module, the inner surface having two or more raised ridges crosswise to a heat exchange flow direction from an inflow port or location to an outflow port or location and having a gap of greater than 0.1 mm between the two or more raised ridges and the surface of the process module.

16 Claims, 4 Drawing Sheets

(58) Field of Classification Search
CPC ............... B01J 19/2415; B01J 2219/00; B01J 2219/00049; B01J 2219/00051; B01J 2219/00074; B01J 2219/00087; B01J 2219/00094; B01J 2219/00159; B01J 2219/00164; B01J 2219/00781; B01J 2219/00788; B01J 2219/0079; B01J 2219/00819; B01J 2219/00822; B01J 2219/00851; B01J 2219/00858; B01J 2219/0086; B01J 2219/00873; B01J 2219/00889; B01J 2219/02; B01J 2219/0204; B01J 2219/0218; B01J 2219/0236; B01J 2219/025; B01J 2219/0263; B01J 2219/24; B01J 2219/2401; B01J 2219/2402; B01J 2219/2403; B01J 2219/2406; B01J 2219/2409; B01J 2219/2411; B01J 2219/2412; F28D 9/00; F28D 9/0031; F28D 9/0037; F28D 21/00; F28D 2021/00; F28D 2021/0019; F28D 2021/0022; F28F 3/00; F28F 3/02; F28F 3/04; F28F 3/048; F28F 7/00; F28F 7/02; F28F 21/00; F28F 21/04; F28F 21/08; F28F 21/081; F28F 21/084; F28F 2250/00; F28F 2250/08; F28F 2265/00; F28F 2265/26

See application file for complete search history.

(56) References Cited

U.S. PATENT DOCUMENTS

2018/0161747 A1* 6/2018 Lavric .................. B01J 19/0093
2018/0170750 A1 6/2018 Del-Gallo et al.

FOREIGN PATENT DOCUMENTS

| CN | 205664481 U | 10/2016 |
|----|-------------|---------|
| DE | 297506 A5 | 1/1992 |
| DE | 102006013503 A1 | 1/2008 |
| EP | 2072460 A1 | 6/2009 |
| EP | 2535105 A1 | 12/2012 |
| JP | 2003-340273 A | 12/2003 |

OTHER PUBLICATIONS

International Search Report and Written Opinion of the International Searching Authority; PCT/US2020/048718; dated Nov. 12, 2020; 11 Pages; European Patent Office.

Maakoul et al., "Numerical comparison of shell-side performance for shell and tube heat exchangers with trefoil-hole, helical and segmental baffles", Applied Thermal Engineering, vol. 109, 2016, pp. 175-185.

Rajiv Mukherjee, "Effectively Design Shell-and-Tube Heat Exchangers", Chemical Engineering Progress, Feb. 1998, 17 pages.

* cited by examiner

HEAT EXCHANGE FLOW REACTOR

CROSS-REFERENCE TO RELATED APPLICATIONS

This application claims the benefit of priority under 35 U.S.C. § 371 of International Application No. PCT/US2020/048718, WO 2021/042023, filed on Aug. 31, 2020, which claims the benefit of priority under 35 U.S.C. § 119 of U.S. Provisional Application No. 62/894,784, filed Aug. 31, 2019, the content of each of which is incorporated herein by reference in its entirety.

FIELD

The disclosure relates generally to apparatuses and methods for flow reactors and flow reaction processing, more specifically to flow reactors comprising a central body having a passage therethrough, first and second major external surfaces and first and second thermal control fluid passages in thermal contact with the first and second major external surfaces, respectively, and with specified pump or pumps for supply of specified thermal control fluid.

BACKGROUND

High performance flow modules for flow reactors have been formed from ceramic materials, particularly silicon carbide, desirably for its very high chemical resistance, high mechanical strength, and reasonably high thermal conductivity. Where tight thermal control of reaction processes is needed, one solution has been use of a generally planar process fluid module 10 as shown in FIG. 1, having two major outer surfaces 12, 14, such as a process fluid module comprised of two plates of silicon carbide or other ceramic joined temporarily or permanently and containing a process fluid passage P defined between the halves, together with heat exchange enclosures 16, 18 as shown in FIG. 2, sealed to each of the two major surfaces 12, 14 and defining, in cooperation with the respective major surfaces, a heat exchange fluid passage HP in contact with the respective major surface. Small protuberances or "turbulators" (not shown) on an inner surface of such heat exchange enclosures have been used to increase turbulence and/or secondary flows in heat exchange fluid flowing through heat exchange fluid passages.

SUMMARY

According to embodiments, a flow reactor includes a flow reactor module having a heat exchange fluid enclosure with an inner surface sealed against a surface of a process fluid module, the inner surface having two or more raised ridges crosswise to a heat exchange flow direction from an inflow port or location to an outflow port or location and having a gap of greater than 0.1 mm between the two or more raised ridges and the surface of the process module.

More specifically, according to more specific embodiments, a flow reactor according to the present disclosure comprises a flow reactor module, the flow reactor module comprising: first, a process fluid module with a process fluid passage extending therethrough, the process fluid module comprising an extended body having a width, a length, and a thickness, the thickness being less than the length and less than the width, the process fluid module having first and second major surfaces on opposite sides of the process fluid module, oriented perpendicularly to a direction of the thickness of the process fluid module; second, a first heat exchange fluid enclosure sealed against the first major surface of the process fluid module, the first heat exchange fluid enclosure comprising an interior surface for containing heat exchange fluid against the first major surface to form a heat exchange fluid path for the heat exchange fluid, and an inflow port or location for delivering heat exchange fluid to the heat exchange fluid path and an outflow port or location for receiving heat exchange fluid from the heat exchange fluid path, the outflow port or location spaced from the inflow port or location in a first direction; and third, a second heat exchange fluid enclosure sealed against the second major surface of the process fluid module, the second heat exchange fluid enclosure comprising an interior surface for containing heat exchange fluid against the second major surface to form the heat exchange fluid path for heat exchange fluid, and an inflow port or location for delivering heat exchange fluid to the heat exchange fluid path and an outflow port or location for receiving heat exchange fluid from the heat exchange fluid path. The interior surface of the first heat exchange fluid enclosure comprises two or more raised ridges extending in a second direction at least partially crosswise to the first direction and having a distance between successive ones of the two or more raised ridges and having a gap between the two or more raised ridges and the first major surface and the inner surface of the second heat exchange fluid enclosure also comprises two or more raised ridges extending in a second direction at least partially crosswise to the first direction and having the distance between successive ones of the two or more raised ridges and having the gap between the two or more raised ridges and the second major surface, and the gap is in the range of from 0.2 to 0.5 mm and the distance is in the range of from 10 mm to 30 mm.

According to embodiments, the flow reactor module can comprise or be formed or constituted of a ceramic. According to embodiments, the ceramic can comprise or be silicon carbide.

According to embodiments, the flow reactor module can monolithic, that is, one body formed as single piece, or if formed from multiple pieces, then formed from multiple pieces permanently joined together so as to be inseparable except by cutting, grinding, or fracturing the module, or the like.

According to embodiments, the first and second heat exchange fluid enclosures can comprise or be formed principally or wholly of a metal. According to embodiments, the metal can comprise, or be, aluminum.

According to embodiments, the interior surface of the first heat exchange fluid enclosure comprises three or more raised ridges and the interior surface of the second heat exchange fluid enclosure comprises three or more raised ridges.

According to embodiments, the distance and the gap can be selected to maximize, to within 80% of a maximum achievable, an average Reynolds number within the heat exchange fluid path within a selected heat exchange fluid and using a selected heat exchange pump power for pumping the heat exchange fluid.

Additional embodiments and various advantages will be apparent from the description, figures, and claims below.

DETAILED DESCRIPTION

Figure 1:
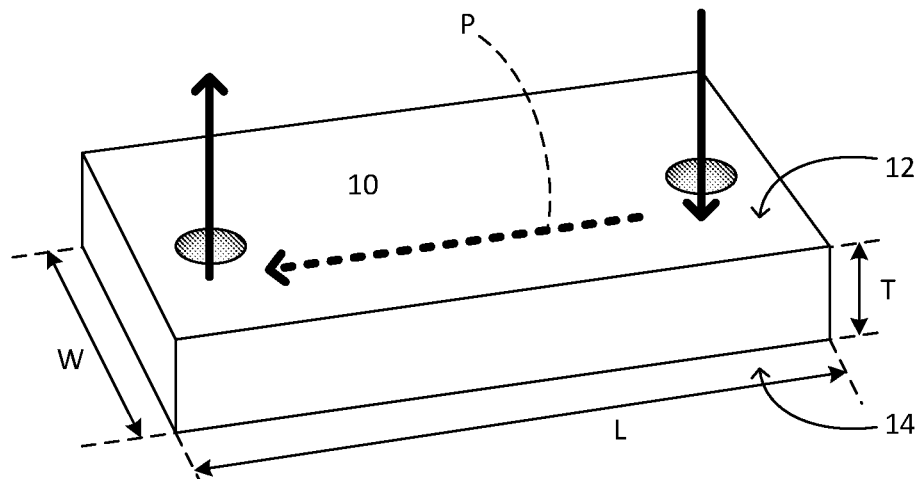
FIG. 1 (Prior Art) is a diagrammatic perspective view of a process fluid module.
Figure 2:
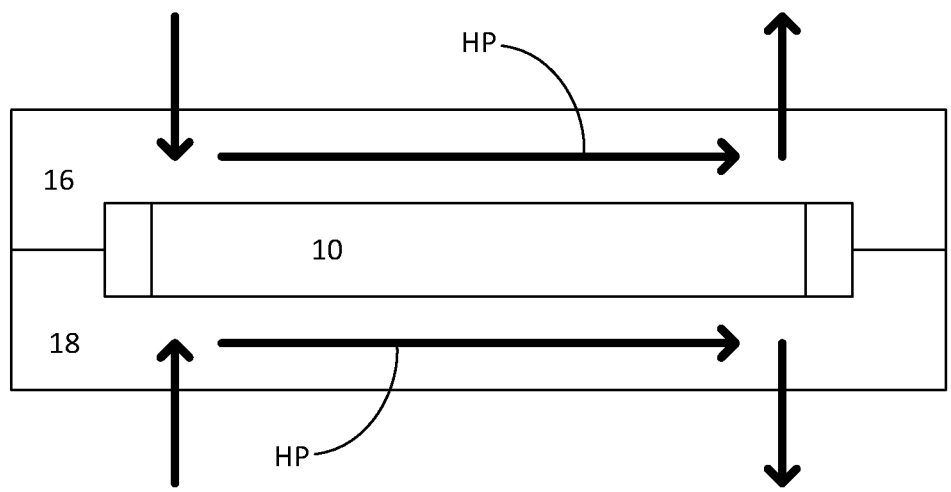
FIG. 2 (Prior Art) is a diagrammatic elevational view of a fluidic module including a process fluid module and heat exchange enclosures.
Figure 3:
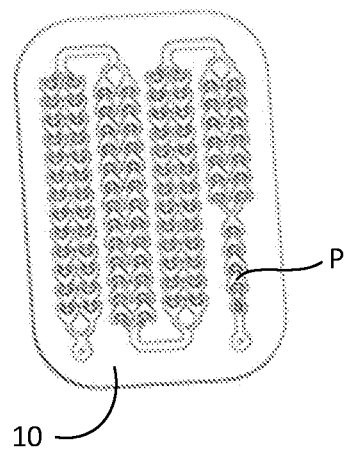
FIG. 3 (Prior Art) is perspective view showing a process fluid module with detail of an embodiment of an (interior) process fluid path.
Figure 4:
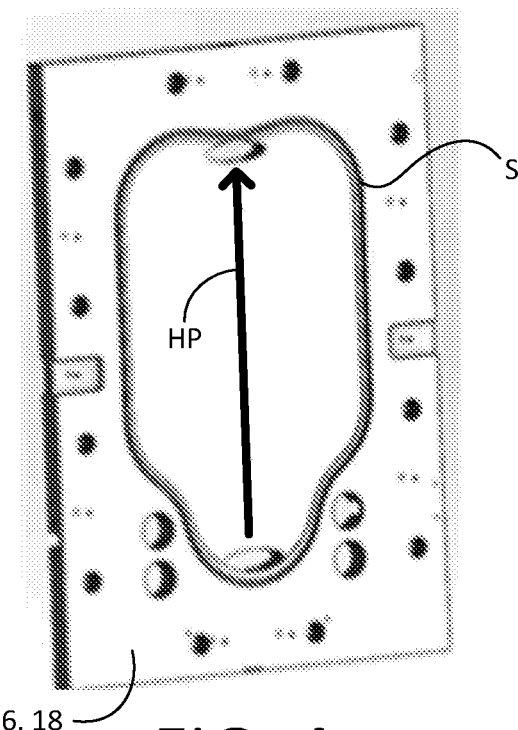
FIG. 4 (Prior Art) is a perspective view of an embodiment of a heat exchange enclosure.

FIGS. 1 and 2 (Prior Art) are discussed above. FIG. 3 (Prior Art) shows a perspective view of a process fluid module 10 with detail of an embodiment of an (interior) process fluid path P, such as may be used in the context of the present disclosure. FIG. 4 (Prior Art) shows a perspective view of an embodiment of a heat exchange enclosure of a general shape which is one shape envisioned for use with the present disclosure.

Figure 5:
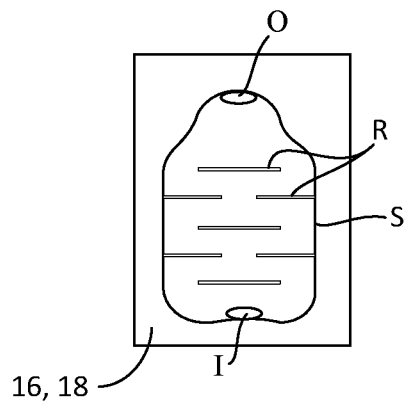
FIGS. 5 and 6 are plan views of embodiments of heat exchanger enclosures with baffles according to the present disclosure.
Figure 6:
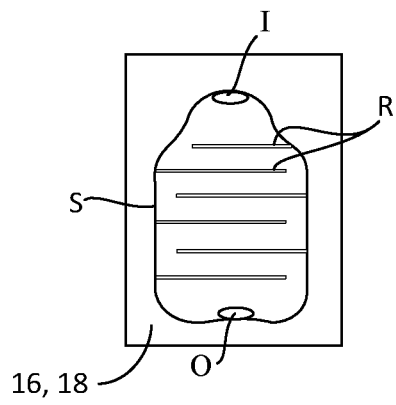
Figure 7:
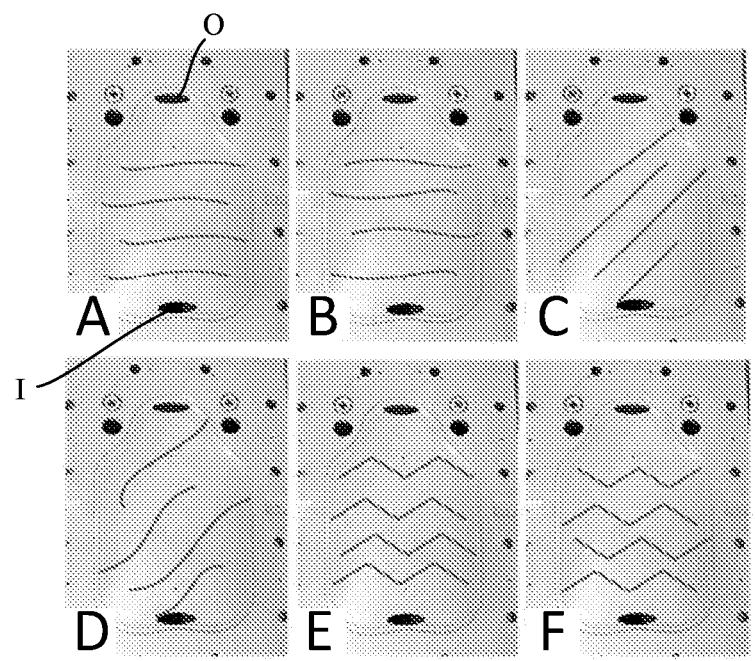
FIG. 7 is a plan view of additional embodiments (A-F) of heat exchanger enclosures with baffles according to the present disclosure.

The present disclosure departs from these prior art structures as shown particularly in FIGS. 5-8. According to one aspect of the present disclosure, with particular reference to FIGS. 5-7, raised ridges R are included on interior surfaces 17, 19 of heat exchange enclosures 16, 18. The ridges R are positioned to serve as baffles within the region bounded by a seal S (such as an O-ring or other seal). The ridges may take various configurations as seen in the embodiments of FIGS. 5 and 6 and in the six variations shown in FIG. 7. Common across all embodiments is that the ridges R number at least two, and that the ridges R extend in a direction (a second direction) at least partially crosswise to a first direction from an inflow port or location I to an outflow port or location O.

Figure 8:
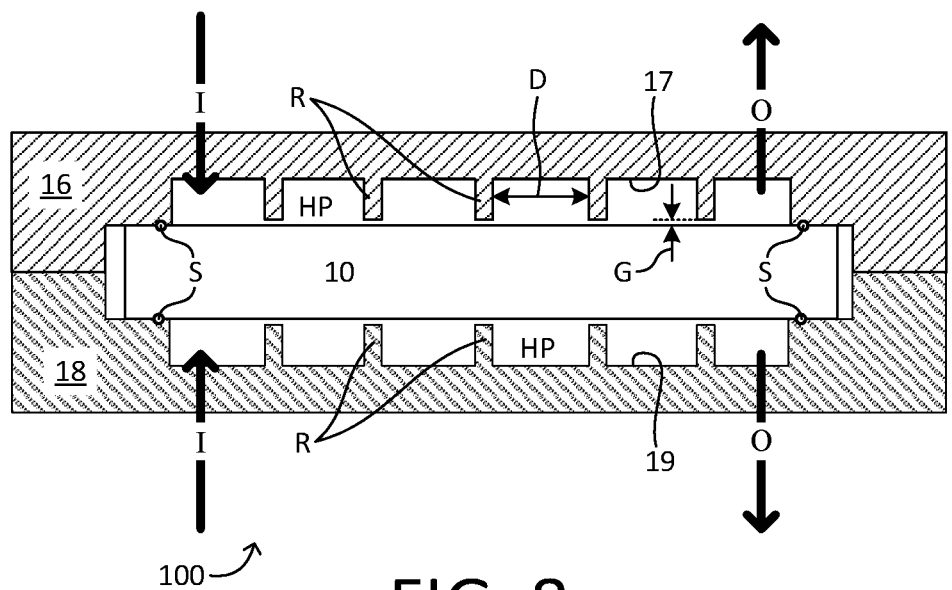
FIG. 8 is a view of a flow reactor module, according to embodiments of the present disclosure, including cross-sectional views of heat exchanger enclosures together with a process fluid module.

As seen with reference to FIG. 8, according to another aspect of the present disclosure, there is a gap G between the two or more raised ridges R on interior surface 17 of the first major surface 14. This gap G is desirable in that it provides protection from induced marring or induced stress in the (desirably) ceramic structure of the process fluid module 10. However, according to the present disclosure, the gap G is intentionally larger than needed to provide reliable mechanical separation between the respective major surfaces 12, 14 of the process fluid module 10 and the associated raised ridges R (larger than 0.1 mm, for example). This is because heat exchange performance can be optimized, for a given heat exchange fluid and a given pump power, by making the gap larger than necessary for mechanical separation. Desirably, the gap is greater than 0.1 mm, desirably greater than 0.2 mm or even greater than 0.3 mm or 0.4 mm, while remaining small enough such that the raised ridges still divert a large amount of flow, such as smaller than 1 mm, desirably smaller than 0.9 mm, than 0.8 mm, than 0.7 mm, than 0.6 mm, than 0.5 mm, or even in appropriate cases than 0.4 mm.

Figure 9:
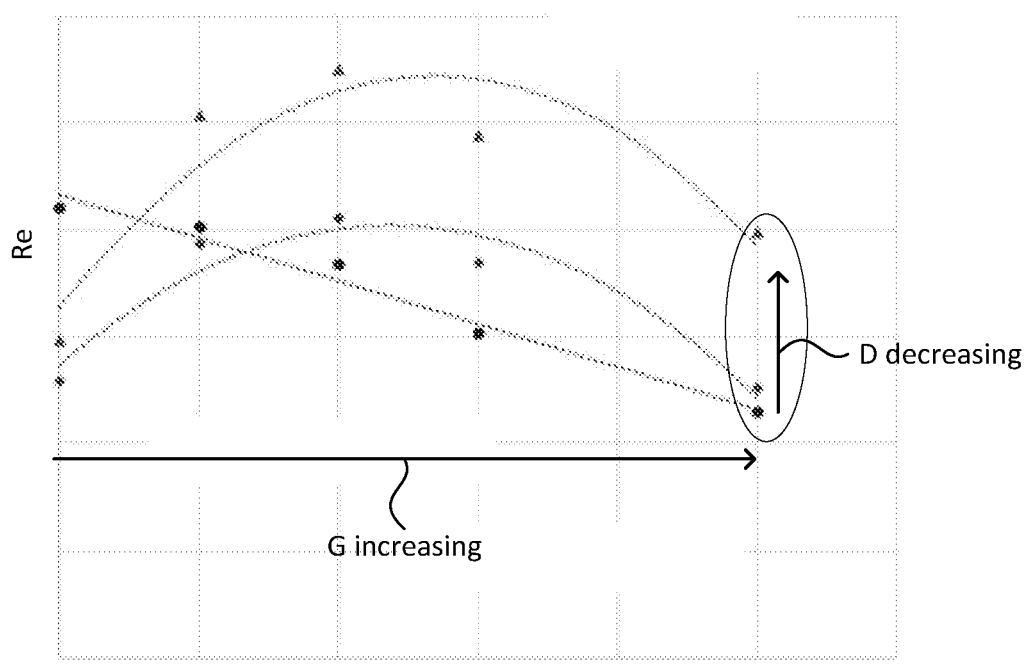
FIG. 9 is a graph of relative Reynolds numbers (Re) obtained within a heat exchange fluid path with a particular heat exchange fluid at a particular pump power as a function of gap (G) for three different distances D (decreasing in the direction of the arrow), showing that the Reynolds number can be optimized for a given pump power and heat exchange fluid by adjusting (decreasing) the distance D and adjusting (enlarging beyond that required for clearance) the gap G.

FIG. 9 is a graph of relative Reynolds numbers (Re, on the y axis) obtained within a heat exchange fluid path with selected heat exchange fluid at a selected maximum pump power as a function of gap G (on the x axis) for three different distances D (decreasing in the direction of the arrow). This graph shows that the Reynolds number (and accordingly heat exchange performance) in the heat exchange fluid path HP can be optimized for a given pump power and heat exchange fluid by adjusting (decreasing) the distance D and adjusting (enlarging beyond that required for mechanical clearance) the gap G. Desirably, the distance (D) and the gap (G) can be selected to maximize within to within 80%, 90% or even 95% of maximum possible, an average Reynolds number within the heat exchange fluid path (HP) within a selected heat exchange fluid and a selected heat exchange pump power for pumping the heat exchange fluid.

The methods and/or devices disclosed herein are generally useful in performing any process that involves mixing, separation, extraction, crystallization, precipitation, or otherwise processing fluids or mixtures of fluids, including multiphase mixtures of fluids—and including fluids or mixtures of fluids including multiphase mixtures of fluids that also contain solids—within a microstructure. The processing may include a physical process, a chemical reaction defined as a process that results in the interconversion of organic, inorganic, or both organic and inorganic species, a biochemical process, or any other form of processing. The following non-limiting list of reactions may be performed with the disclosed methods and/or devices: oxidation; reduction; substitution; elimination; addition; ligand exchange; metal exchange; and ion exchange. More specifically, reactions of any of the following non-limiting list may be performed with the disclosed methods and/or devices: polymerisation; alkylation; dealkylation; nitration; peroxidation; sulfoxidation; epoxidation; ammoxidation; hydrogenation; dehydrogenation; organometallic reactions; precious metal chemistry/homogeneous catalyst reactions; carbonylation; thiocarbonylation; alkoxylation; halogenation; dehydrohalogenation; dehalogenation; hydroformylation; carboxylation; decarboxylation; amination; arylation; peptide coupling; aldol condensation; cyclocondensation; dehydrocyclization; esterification; amidation; heterocyclic synthesis; dehydration; alcoholysis; hydrolysis; ammonolysis; etherification; enzymatic synthesis; ketalization; saponification; isomerisation; quaternization; formylation; phase transfer reactions; silylations; nitrile synthesis; phosphorylation; ozonolysis; azide chemistry; metathesis; hydrosilylation; coupling reactions; and enzymatic reactions.

Although only a few embodiments have been described in detail in this disclosure, many modifications are possible (e.g., variations in sizes, dimensions, structures, shapes, and proport or locationions of the various elements, values of parameters, mounting arrangements, use of materials, orientations) without materially departing from the novel teachings and advantages of the subject matter described herein. For example, both flat and curved glass articles may be tempered according to the methods described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present inventive technology.

The invention claimed is:

1. A flow reactor, comprising
a flow reactor module (100), the flow reactor module (100) comprising:
  a process fluid module (10) with a process fluid passage (P) extending therethrough, the process fluid module (10) comprising an extended body (22) having a width (W), a length (L), and a thickness (T), the thickness (T) being less than the length (L) and less than the width (W), the process fluid module (10) having first and second major surfaces (12, 14) on opposite sides of the process fluid module (10), oriented perpendicularly to a direction of the thickness (T) of the process fluid module (10); and
  a first heat exchange fluid enclosure (16) sealed against the first major surface (12) of the process fluid module, the first heat exchange fluid enclosure (16) comprising an interior surface (17) for containing heat exchange fluid against the first major surface (12) to form a heat exchange fluid path (HP) for the heat exchange fluid, and an inflow port or location (I) for delivering heat exchange fluid to the heat exchange fluid path (HP) and an outflow port or location (0) for receiving heat exchange fluid from the heat exchange fluid path (HP), the outflow port or location (0) spaced from the inflow port or location (I) in a first direction,
  wherein the interior surface (17) comprises two or more raised ridges (R) extending in a second direction at least partially crosswise to the first direction and having a distance (D) between successive ones of the two or more raised ridges and having a gap (G) between the two or more raised ridges (R) and the first major surface (12).

2. A flow reactor according to claim 1, wherein the flow reactor module comprises a ceramic.

3. A flow reactor according to claim 2, wherein the ceramic comprises silicon carbide.

4. A flow reactor according to claim 2, wherein the flow reactor module is monolithic.

5. A flow reactor according to claim 2, wherein the first heat exchange fluid enclosures comprises a metal.

6. A flow reactor according to claim 5, wherein the metal comprises aluminum.

7. A flow reactor according to claim 1, wherein the interior surface (17) comprises three or more raised ridges (R).

8. A flow reactor according to claim 1, wherein the distance (D) and the gap (G) are selected to maximize within to within 80% of maximum an average Reynolds number within the heat exchange fluid path (HP) within a selected heat exchange fluid and a selected heat exchange pump power for pumping the heat exchange fluid.

9. A flow reactor according to claim 1, wherein the gap (G) is in the range of from 0.2 to 0.5 mm.

10. A flow reactor according to claim 1, wherein the distance (D) is in the range of from 10 mm to 30 mm.

11. A flow reactor according to claim 1, wherein the flow reactor module further comprises:
  a second heat exchange fluid enclosure (18) sealed against the second major surface (14) of the process fluid module (10), the second heat exchange fluid enclosure (18) comprising an interior surface (19) for containing heat exchange fluid against the second major surface (14) to form the heat exchange fluid path (HP) for heat exchange fluid, and an inflow port or location (I) for delivering heat exchange fluid to the heat exchange fluid path (HP) and an outflow port or location (0) for receiving heat exchange fluid from the heat exchange fluid path (HP),
  wherein the interior surface (19) also comprises two or more raised ridges (R) extending in a second direction at least partially crosswise to the first direction and having the distance (D) between successive ones of the two or more raised ridges (R) and having the gap (G) between the two or more raised ridges (R) and the second major surface (14).

12. A flow reactor according to claim 11, wherein the second heat exchange fluid enclosure (18) comprises a metal.

13. A flow reactor according to claim 12, wherein the metal comprises aluminum.

14. A flow reactor according to claim 11, wherein the interior surface (19) comprises three or more raised ridges (R).

15. A flow reactor according to claim 11, wherein the gap (G) is in the range of from 0.2 to 0.5 mm.

16. A flow reactor according to claim 11, wherein the distance (D) is in the range of from 10 mm to 30 mm.

* * * * *

UNITED STATES PATENT AND TRADEMARK OFFICE
CERTIFICATE OF CORRECTION

| | | |
|---|---|---|
| PATENT NO. | : 11,850,564 B2 | Page 1 of 1 |
| APPLICATION NO. | : 17/636948 | |
| DATED | : December 26, 2023 | |
| INVENTOR(S) | : Sylvain Maxime F Gremetz et al. | |

It is certified that error appears in the above-identified patent and that said Letters Patent is hereby corrected as shown below:

In the Claims

In Column 5, Line 48, in Claim 5, delete "enclosures" and insert -- enclosure (16) --.

Signed and Sealed this
Tenth Day of September, 2024

Katherine Kelly Vidal
*Director of the United States Patent and Trademark Office*